May 6, 1952  H. A. REECE  2,595,296
TUYERE ARRANGEMENT IN CUPOLA FURNACES
Filed June 15, 1950
Fig. 1
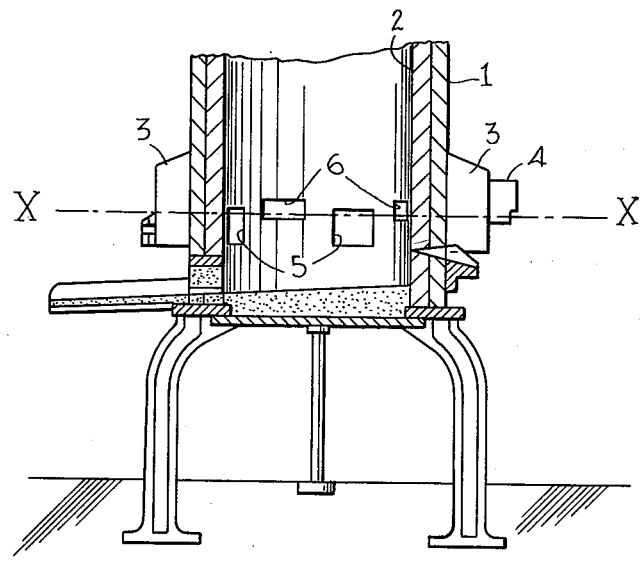
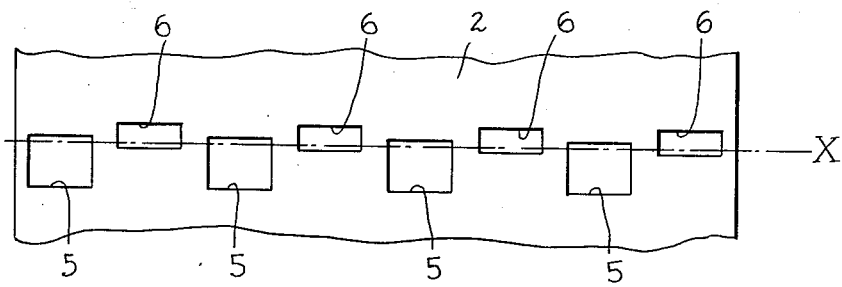
Fig. 2
INVENTOR.
HERBERT A. REECE
BY
William Idler
ATTORNEY Patented May 6, 1952

2,595,296

UNITED STATES PATENT OFFICE 2,595,296

TUYÈRE ARRANGEMENT IN CUPOLA FURNACES

Herbert A. Reece, Cleveland Heights, Ohio

Application June 15, 1950, Serial No. 168,247

3 Claims. (Cl. 266—30)

This invention relates, as indicated, to tuyère arrangement in cupola furnaces and the like.

Many and varied types and arrangements of tuyères in cupola furnaces have heretofore been used and proposed, in attempts to obtain improved combustion, greater penetration of the blast, and to decrease or lessen the tendency toward formation of "bridges" or "scaffolds" (mixtures of slag, iron and coke) in the cupola furnace. Some of these types and sizes of tuyères are shown on page 15 of "Melting Iron in the Cupola," by J. E. Hurst, published by The Penton Publishing Company in 1929.

As air ($O_2$) enters the cupola shaft from the ports or tuyères, it comes into contact with the incandescent carbon of the coke in the cupola shaft. When the velocity of the air ($O_2$) is high, that is to say, when high velocity tuyères are used, incomplete combustion takes place, with unused oxygen present, the oxygen being carried higher in the melting zone, with greater time of contact between the droplets of molten iron. When the velocity of the air is low, that is to say, when low velocity tuyères are used, a rapid formation of $CO_2$ takes place, the droplets of iron are subjected to this $CO_2$, and the heat necessary for melting the iron is dissipated in the coke bed, rather than in the melting zone of the shaft. This leads to rapid deterioration of the coke bed, with consequent changes in the Belden curve (see Bulletin 54—U. S. Bureau of Mines, 1913, and pages 34 and 35 of Gray Cast Iron, by John W. Bolton, published by the Penton Publishing Company in 1937) occurring during the heat. Thus, with both high velocity and low velocity of the air entering the shaft, the problem of efficient melting of the iron is present. Equalized velocity tuyères have the disadvantage of rapid burn out of the lining of the cupola in specific areas directly above the cover plates.

Efficient melting involves the problem of having the gases $CO_2$ and $CO$ present in substantially equal proportions at the melting zone, with free oxygen substantially absent. The $CO_2$ content of the gases is required to furnish the required number of B. t. u.'s for imparting temperature to the iron melted, while the $CO$ content of the gases is required to furnish absorbable carbon for the iron being melted. The optimum condition, in addition to this, is to have the smallest amount of $O_2$ present at the least height above the tuyères.

I have discovered that the aforesaid disadvantages and undesirable effects of high and low velocity air input into the shaft can be eliminated or minimized to a great extent, and the efficiency of cupola melting greatly increased, by utilizing a combination of high and low velocity air input in a manner designed to accomplish the following results:

1. Less bridging of the cupola.
2. Better combustion.
3. Better penetration of the blast.

I accomplish these results by utilizing a novel arrangement of tuyères in the walls of the cupola shaft, as will hereinafter appear, reference being had to the accompanying drawing, wherein is shown a typical embodiment of the invention. In said annexed drawings, Fig. 1 is a fragmentary cross-sectional view of a cupola furnace, showing one arrangement of the tuyères according to the invention, and Fig. 2 is a development, on an enlarged scale, of the entire inner wall of the cupola shaft shown in Fig. 1, showing the arrangement of the emergent ends of the tuyère openings.

Referring more particularly to the drawings, reference numeral 1 designates the shell of a cupola furnace, having a refractory lining 2, a wind box 3 surrounding the lower porton of the shell, and adapted to receive air from a blast pipe 4.

The air thus received in the windbox 3, is blown into the shaft through a series of tuyères, the emergent openings of which are designated 5 and 6, respectively, these openings being arranged in spaced relation about the entire circumference of the inner wall or lining of the shaft.

In this specific instance, the total number of tuyère openings is eight, and the four openings 6 are arranged alternately with and in staggered relation to the four openings 5, with a horizontal plane passing through all of the tuyères. For practical purposes, the tuyères or openings 5 are 8 inches in height, and the tuyères or openings 6 are 4 inches in height, with a horizontal plane X—X intersecting all of the openings. From this plane, the tuyères 5 extend downwardly and the tuyères 6 upwardly. This arrangement and size of tuyères is used in lieu of a normal arrangement of tuyères in which all of the tuyères are of 6 inches in height, and disposed in side by side relation.

The larger tuyères 5 provide a high velocity flow, which is contrary to what those skilled in this art would normally expect, while the smaller tuyères 6 provide a low velocity flow of air into the cupola furnace. The total tuyère area has been found to produce the best results when it is equivalent to 29% of the area of a 36 inch cupola, but this varies with the size of the cupola and is not a prime consideration, insofar as this invention is concerned.

It is presumed that the lag of gas obtained by the high velocity air, which has 4 inches farther to travel than the low velocity air, performs a buffing action for just a sufficient length of time to accomplish a better admixture in the presence of the incandescent carbon in the coke, with consequent better penetration of the oxygen to the center of the cupola, and a more even velocity throughout the cupola shaft than is obtained when all of the tuyères, regardless of area, are in the same horizontal plane (non-staggered). The two speeds of air, with actual confluence to create the time lag, provides a controlled differential velocity. Thus, while we may have a linear flow of air at the higher velocity through the tuyères 5 of 21 linear feet per second, it will meet the lower velocity air from tuyères 6 which has a flow of 12 linear feet per second, and from this confluence of air, we not only obtain a retarded linear flow and time lag, but a dissipation of the air currents as well.

The air entering a cupola, with a conventional or normal arrangement of tuyères, has a higher velocity at the walls of the cupola than in the center of the cupola, due to the resistance imposed by the cupola charge. The present arrangement of tuyères in staggered relation, with a horizontal plane passing through all of the tuyères, apparently eliminates this difference in velocity, in the melting zone, at least.

The new arrangement of tuyères is not to be confused with an arrangement of tuyères, in which an auxiliary or second row of tuyères is disposed directly above or in staggered relation to a first row of tuyères. In such an arrangement, the upper row of tuyères, even when staggered with respect to the first row of tuyères, is not so arranged that a single horizontal plane can intersect both rows of tuyères.

Although the tuyère arrangement has been described with reference to a circular cupola furnace, it will be understood that substantially the same arrangement with like results, can be used in connection with cupola furnaces of square or rectangular cross-section.

It is to be understood that various changes in the size of tuyère openings, their arrangement, and the extent to which they are in staggered relation with each other, may be made, without substantial loss of the advantages resulting from the arrangement, as described, and without departing from the scope of the appended claims.

Having thus described my invention, I claim:

1. In a cupola furnace, an arrangement of tuyères comprising a row of horizontally-spaced tuyères of predetermined height and through which air passes into the cupola in a substantially horizontal direction, and a second row of horizontally-spaced tuyères of less height than those of the first row, and through which the air passes into the cupola in a substantially horizontal direction, the tuyères of the second row alternating with the tuyères of the first row, all of the tuyères being intersected by a common horizontal plane, with portions of the tuyères of the second row being disposed above a horizontal plane passing through the upper edges of the tuyères in the first row.

2. A cupola furnace, as defined in claim 1, in which all of the tuyères are of substantially the same width.

3. A cupola furnace, as defined in claim 1, in which the tuyères of the second row are substantially half the height of the tuyères in the first row.

HERBERT A. REECE.

REFERENCES CITED

The following references are of record in the file of this patent:

UNITED STATES PATENTS

| Number | Name | Date |
|---|---|---|
| 64,645 | Dougherty | May 14, 1867 |
| 66,962 | Hotchkiss | July 23, 1867 |
| 172,836 | Voisin | Feb. 1, 1876 |
| 240,135 | Ibrugger | Apr. 12, 1881 |
| 324,623 | Whiting | Aug. 18, 1885 |
| 1,205,568 | Ross | Nov. 21, 1916 |
| 1,640,251 | Poumay | Aug. 23, 1927 |

FOREIGN PATENTS

| Number | Country | Date |
|---|---|---|
| 20,924 of 1913 | Great Britain | Mar. 26, 1914 |